No. 765,815. PATENTED JULY 26, 1904.
F. CHRISTEN.
LIQUID DELIVERING AND MEASURING DEVICE.
APPLICATION FILED FEB. 6, 1904.
NO MODEL.
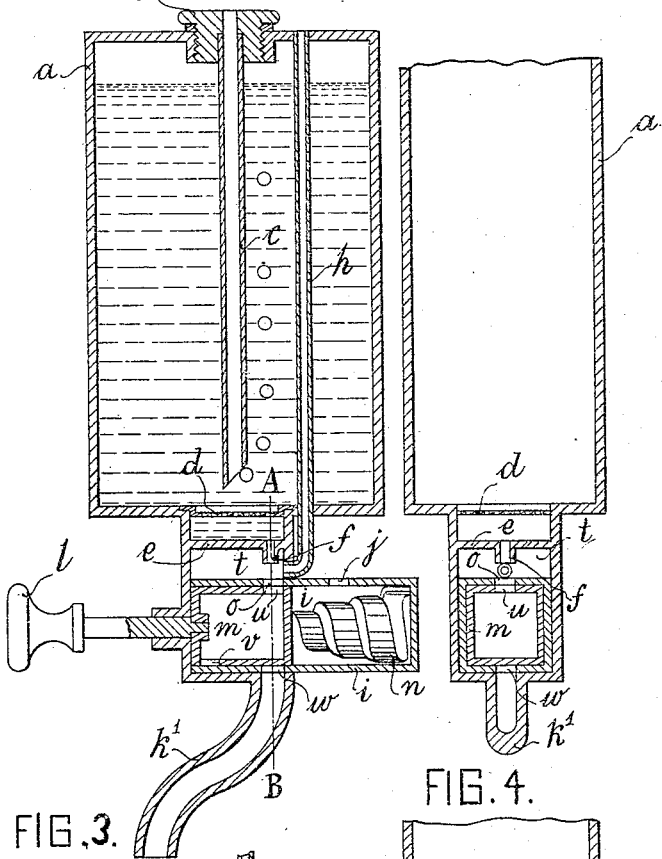
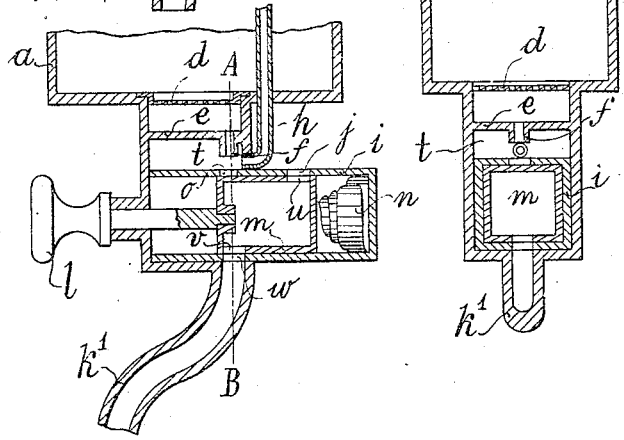
WITNESSES
INVENTOR
Franz Christen
ATTORNEYS No. 765,815. Patented July 26, 1904.

UNITED STATES PATENT OFFICE.

FRANZ CHRISTEN, OF BERLIN, GERMANY.

LIQUID DELIVERING AND MEASURING DEVICE.

SPECIFICATION forming part of Letters Patent No. 765,815, dated July 26, 1904.

Application filed February 6, 1904. Serial No. 192,436. (No model.)

*To all whom it may concern:*

Be it known that I, FRANZ CHRISTEN, merchant, a subject of the German Emperor, and a resident of No. 37 Bülowstrasse, Berlin, in the Empire of Germany, have invented a certain new and useful Liquid Delivering and Measuring Device, of which the following is an exact, full, and clear description.

This invention relates to an apparatus for the delivery of liquid, especially soapsuds, for washstands, by means of which apparatus only a measured quantity of the liquid is obtainable. This apparatus comprises the combination of a rotary or slidable gage with a liquid vessel in form of the Mariotte bottle. The said hollow gage regulates the discharge of the vessel, and in one position, in which the gage is automatically turned by the action of a spring or weight, the discharge-opening remains cut off, while in another end position the outflow or emptying of the quantity of liquid contained in the gage is effected through a discharge-pipe.

The construction of the vessel according to the principle of the Mariotte bottle enables, notwithstanding the varying level, the hydrostatic pressure to be constantly maintained at a low limit, whereby the gage is relieved and its leakage is prevented. The principle of the Mariotte bottle can thus be utilized in that the intermittent regular delivery of the liquid cannot be effected without the observation of certain longer intervals between the individual operations. Thus an excessive waste of the liquid which would be produced when leaving open an unautomatic closing-tap or when allowing an automatic closing-tap to operate continuously will be obviated by the improved apparatus.

The apparatus is not only suitable for the periodical delivery of soapsuds in washstands, but also for the distribution of odoriferous water and essences in exhibitions and for serving drinks. By providing the apparatus with a coin-freed device, which only operates after the insertion of a coin, the apparatus can be rendered automatic for the delivery of liquid.

Referring to the accompanying drawings, Figure 1 is a vertical section through the apparatus, in which a slidable gage is used. Fig. 2 shows the corresponding section according to line C D of Fig. 1. Fig. 3 shows the gage in the position in which the delivery of the liquid takes place, but in vertical section like Fig. 1; and Fig. 4 shows the corresponding section again according to line C D of Fig. 1.

The upper half of the apparatus consists of a Mariotte bottle, which is formed by the receptacle $a$, tap $b$, and air-pipe $c$, extending near to the bottom. The lower part consists of a tapping device.

The preferred construction of the apparatus is as follows: At the bottom of the receptacle $a$, which is in the form of a Mariotte bottle with tap $b$ and air-pipe $c$, there is a sieve $d$ for retaining foreign substances. Below the sieve $d$ is the bottom $e$, with the dropping-tube which extends into the air-chamber $t$, communicating with the atmosphere through the pipe $h$. Below the air-chamber $t$ is the prismatic chamber $i$, which communicates at its upper side through opening $o$ with the air-chamber $t$ and through an opposite opening $j$ with the atmosphere; further, at its lower side through an opening $w$ with a discharge-pipe $k'$. In this chamber $i$ is the gage $m$, which forms a hollow chamber and is slidable by means of a push-button $l$ and is provided above and below with suitably-located openings $u$ and $v$. The gage $m$ is held in its position of rest by the spring $n$ in the chamber $i$ and serves as liquid measure or gage for the quantity of liquid to be delivered at each operation. When the emptied gage $m$ is returned to its position of rest after releasing the button $l$ by the spring $n$, the liquid at $o$ and $u$ drops at a uniform speed into the gage $m$, while the air contained therein escapes through the tube $f$ in consequence of the constant pressure prevailing in the Mariotte bottle, and the said liquid always fills the gage within the same space of time, no matter whether the apparatus is completely filled with liquid or is nearly empty. By suitably gaging the active pressure in the Mariotte bottle, which pressure depends on the extent to which the pipe c reaches downward, thus by gaging the length of the air-pipe c, as also the dimensions of the dropping-tube f, any suitable filling speed can be attained; but one-fourth of a minute to two minutes at the most will generally be adopted. Consequently the possible maximum consumption is regulated accordingly.

Fig. 3 shows the gage m filled with liquid and pushed forward against the action of the spring—i. e., cut off from further supply and in communication with the discharge-pipe k'—the air being permitted to pass from above at u through the opening j, so that the liquid flows out.

The vessel a is provided with means for preventing the passage of dust to the liquid and also for obviating an evaporation and thickening of the liquid.

Having now particularly described and ascertained the nature of the said invention, I declare that what I claim, and wish to secure by Letters Patent, is—

An apparatus for delivering liquids in measured quantities, comprising a vessel of the Mariotte type, a dropping-tube in the bottom thereof, a casing beneath said tube having openings therein, a movable gage therein having inlet and exhaust openings therein, said inlet-opening communicating with the dropping-tube in one position of the gage, an air-chamber between the vessel and the casing through which the liquid passes and a vent h connecting said chamber to the atmosphere, substantially as described.

In witness whereof I have hereunto set my hand in presence of two witnesses.

FRANZ CHRISTEN.

Witnesses:
 HENRY HASPER,
 WOLDEMAR HAUPT.